(12) United States Patent
Wang

(10) Patent No.: US 8,976,321 B2
(45) Date of Patent: Mar. 10, 2015

(54) FLUORESCENT POWDER MIXTURE, MANUFACTURING METHOD FOR THE SAME, AND CORRESPONDING LIQUID CRYSTAL DISPLAY DEVICE

(75) Inventor: Yewen Wang, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 296 days.

(21) Appl. No.: 13/635,718

(22) PCT Filed: Jun. 8, 2012

(86) PCT No.: PCT/CN2012/076620
§ 371 (c)(1),
(2), (4) Date: Sep. 18, 2012

(87) PCT Pub. No.: WO2013/174041
PCT Pub. Date: Nov. 28, 2013

(65) Prior Publication Data
US 2013/0314646 A1 Nov. 28, 2013

(30) Foreign Application Priority Data
May 24, 2012 (CN) .......................... 2012 1 0163194

(51) Int. Cl.
G02F 1/1335 (2006.01)
C01G 19/02 (2006.01)
C01G 9/02 (2006.01)
C01F 7/00 (2006.01)

(52) U.S. Cl.
USPC .............. 349/69; 349/70; 349/71; 423/594.9; 423/594.14; 423/600

(58) Field of Classification Search
USPC .............. 349/69–71; 423/594.9, 594.14, 600
See application file for complete search history.

(56) References Cited

U.S. PATENT DOCUMENTS

| | | | | |
|---|---|---|---|---|
| 5,372,620 A * | 12/1994 | Rowse et al. | | 51/309 |
| 6,168,729 B1 * | 1/2001 | Toki et al. | | 252/301.4 R |
| 7,125,536 B2 * | 10/2006 | Fu et al. | | 423/592.1 |
| 7,416,685 B2 * | 8/2008 | Ooshima et al. | | 252/301.4 F |
| 7,572,431 B2 * | 8/2009 | Seal et al. | | 423/608 |
| 2003/0001495 A1 * | 1/2003 | Liu et al. | | 313/512 |
| 2005/0218782 A1 * | 10/2005 | Ooshima et al. | | 313/486 |
| 2006/0133107 A1 * | 6/2006 | Chen | | 362/611 |
| 2009/0239148 A1 * | 9/2009 | Jiang | | 429/221 |
| 2010/0164367 A1 * | 7/2010 | Shioi et al. | | 313/503 |
| 2011/0171095 A1 * | 7/2011 | Mepsted et al. | | 423/277 |
| 2012/0141358 A1 * | 6/2012 | Chen et al. | | 423/594.9 |
| 2012/0211355 A1 * | 8/2012 | Choi et al. | | 204/192.29 |

FOREIGN PATENT DOCUMENTS

JP 01194254 A * 8/1989

* cited by examiner

*Primary Examiner* — Michael Caley
*Assistant Examiner* — Jia Pan
(74) *Attorney, Agent, or Firm* — Kirton McConkie; Evan R. Witt

(57) ABSTRACT

The present invention relates to a fluorescent powder mixture, a manufacturing method for the same, and a corresponding liquid crystal display device. The fluorescent powder mixture is a mixture of a conductive powder and a fluorescent powder, wherein the conductive powder is aluminum zinc oxide, gallium zinc oxide, or indium tin oxide. The fluorescent powder mixture, the manufacturing method for the same, and the corresponding liquid crystal display device of the present invention increase the conductivity of the fluorescent powder, and further weaken the electron enrichment phenomenon on the surface of the fluorescent powder, so as to increase the illumination performance of the fluorescent powder.

6 Claims, 1 Drawing Sheet

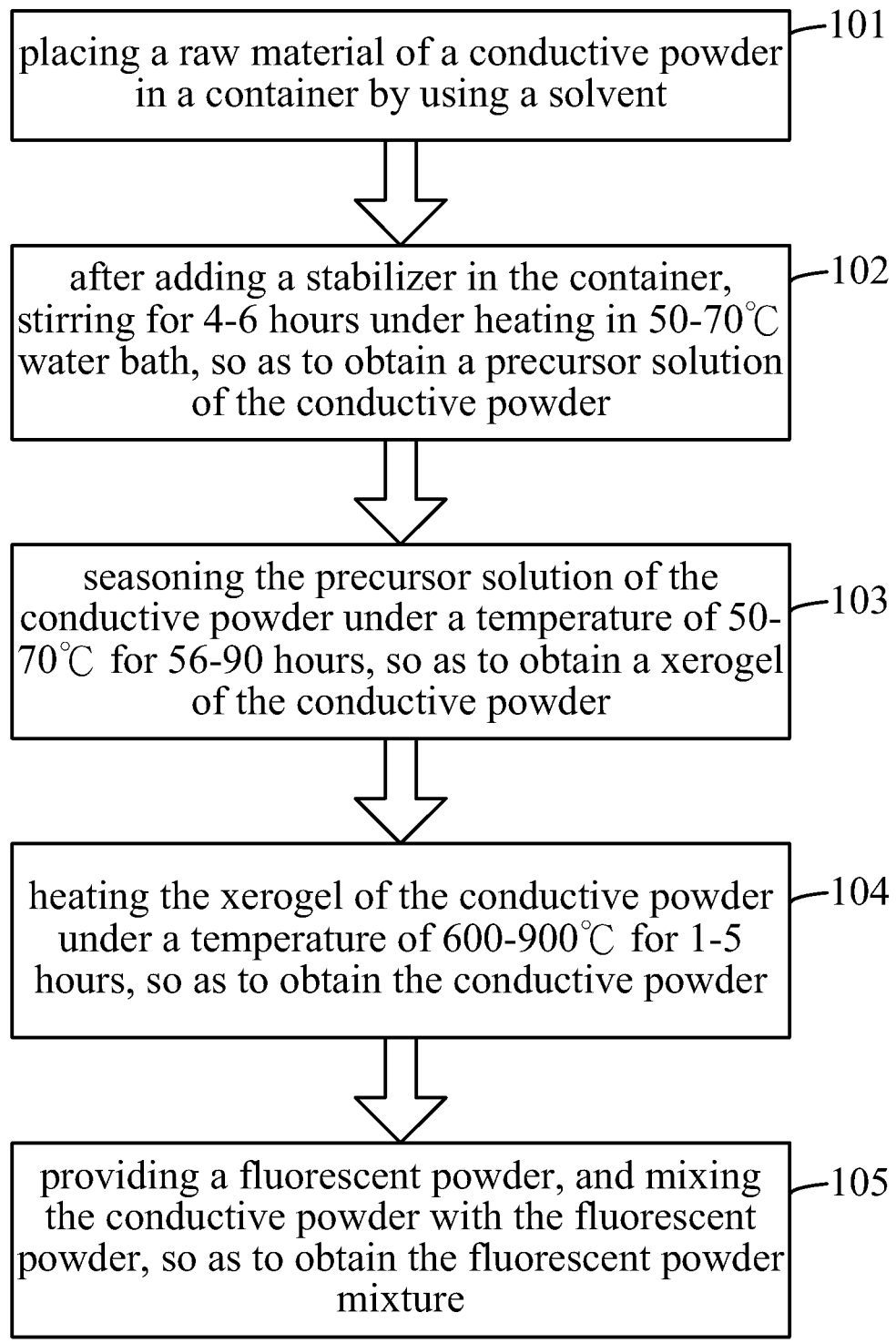

FLUORESCENT POWDER MIXTURE, MANUFACTURING METHOD FOR THE SAME, AND CORRESPONDING LIQUID CRYSTAL DISPLAY DEVICE

BACKGROUND OF THE INVENTION

1. Field of the Invention

The present invention relates to a field of fluorescent powder manufacturing, and more particularly, to a fluorescent powder mixture which may increase the illumination efficiency of a field emission light source, a manufacturing method for the same, and a corresponding liquid crystal display device.

2. Description of the Prior Art

Liquid crystal displays have become mainstream displays because of having advantages of clear image quality, light and thin, portable, low power consumption, and long life. The backlight source used by a traditional liquid crystal display is mainly cold cathode fluorescent lamp (CCFL) and light emitting diode (LED). As a new type of surface light source, the field emission light source has advantages of high illumination efficiency, low power consumption, long lifetime, and easy to control. Therefore, the field emission light source has become a very promising backlight source of a liquid crystal display.

The operating principle of the field emission light source is to bombard the fluorescent powder by electron beams, so as to emit light. Generally speaking, carbon nanotube or ZnO nanoline are generally utilized as the cathode of the field emission light source, while the anode is fluorescent powder, and electron beams emitted from the cathode bombard the fluorescent powder to emit light. Currently, common fluorescent powder used for the field emission light source includes zinc sulfide and rare earth ion excited oxide or sulfur oxide. For sulfide fluorescent powder, the illumination brightness is higher. However, under the bombardment of the electron beams of a high beam density, decomposition will be easily happened to the sulfide, and makes the fluorescent powder have poor stability. For oxide fluorescent powder, it has higher stability, but the illumination efficiency is lower under the bombardment of the electron beams of low pressure. Meanwhile, the conductivity of the two materials is both poor. Thus, when the beam density of the electron beams is high, electron enrichment may easily occur on the surface of the fluorescent powder. Electron enrichment lowers the voltage between the cathode and the anode, then lowers the energy of the incident electron beam, and finally causes the illumination performance to decline.

Therefore, there is a need to provide a fluorescent powder mixture, a manufacturing method for the same, and a corresponding liquid crystal display device, so as to overcome the disadvantages in the prior art.

BRIEF SUMMARY OF THE INVENTION

An object of the present invention is to provide a fluorescent powder mixture, a manufacturing method for the same, and a corresponding liquid crystal display device, wherein a conductive powder and a fluorescent powder are mixed to produce the fluorescent powder mixture, so that the conductivity of the fluorescent powder is increased, the electron enrichment phenomenon on the surface of the fluorescent powder is further weakened, the illumination performance of the fluorescent powder is increased, and the technical problem of that the illumination performance of the fluorescent powder of traditional field emission light source being poor is solved.

To overcome the above-mentioned problem, the present invention provides a technical solution, as follows:

The present invention relates to a fluorescent powder mixture, wherein the fluorescent powder mixture comprises a conductive powder and a fluorescent powder, wherein the conductive powder is aluminum zinc oxide, gallium zinc oxide or indium tin oxide.

In the fluorescent powder mixture of the present invention, the weight proportion of the conductive powder in the fluorescent powder mixture is 1%-5%.

In the fluorescent powder mixture of the present invention, the molar ratio of aluminum atom to zinc atom in the aluminum zinc oxide is 1:99-5:95; the molar ratio of gallium atom to zinc atom in the gallium zinc oxide is 1:99-5:95; and the molar ratio of indium atom to tin atom in the indium tin oxide is 1:99-5:95.

In the fluorescent powder mixture of the present invention, the fluorescent powder is $Y_2SiO_4$:Ce, $CaGaO_3$:Tm, $BaMgAl_{10}O_{17}$:Eu, $ZnGa_2O_4$:Mn, $Y_2SiO_5$:Tb, $Zn_2SiO_4$:Mn, YAG:Ce or $Y_2O_3$:Eu.

In the fluorescent powder mixture of the present invention, the conductive powder is obtained by a sol-gel process.

The present invention further relates to a method for manufacturing fluorescent powder mixture, comprising steps of:

placing a raw material of a conductive powder in a container by using a solvent;

after adding a stabilizer in the container, stirring for 4-6 hours under heating in 50-70° C. water bath, so as to obtain a precursor solution of the conductive powder;

seasoning the precursor solution of the conductive powder under a temperature of 50-70° C. for 56-90 hours, so as to obtain a xerogel of the conductive powder;

heating the xerogel of the conductive powder under a temperature of 600-900° C. for 1-5 hours, so as to obtain a powder of the conductive powder; and providing a fluorescent powder, and mixing the conductive powder with the fluorescent powder, so as to obtain the fluorescent powder mixture, wherein the raw material of the conductive powder is a mixture of aluminum salt and zinc salt, a mixture of gallium salt and zinc salt or a mixture of tin salt and indium salt; and the conductive powder is aluminum zinc oxide, gallium zinc oxide or indium tin oxide.

In the method for manufacturing fluorescent powder mixture of the present invention, the weight proportion of the conductive powder in the fluorescent powder mixture is 1%-5%.

In the method for manufacturing fluorescent powder mixture of the present invention, the molar ratio of aluminum atom to zinc atom in the aluminum zinc oxide is 1:99-5:95; the molar ratio of gallium atom to zinc atom in the gallium zinc oxide is 1:99-5:95; and the molar ratio of indium atom to tin atom in the indium tin oxide is 1:99-5:95.

In the method for manufacturing fluorescent powder mixture of the present invention, the solvent is solution of ethylene glycol monomethyl ether or ethanol solution; and the stabilizer is monoethanolamine, diethanolamine or triethanolamine.

In the method for manufacturing fluorescent powder mixture of the present invention, the fluorescent powder is $Y_2SiO_4$:Ce, $CaGaO_3$:Tm, $BaMgAl_{10}O_{17}$:Eu, $ZnGa_2O_4$:Mn, $Y_2SiO_5$:Tb, $Zn_2SiO_4$:Mn, YAG:Ce or $Y_2O_3$:Eu.

In the method for manufacturing fluorescent powder mixture of the present invention, the conductive powder is obtained by a sol-gel process.

The present invention further relates to a liquid crystal display device, comprising: a display panel; and a backlight module providing a light to the display panel, comprising: a field emission light source, which is provided with a fluorescent powder mixture disposed on its anode; wherein the fluorescent powder mixture comprises a conductive powder and a fluorescent powder, and wherein the conductive powder is aluminum zinc oxide, gallium zinc oxide or indium tin oxide.

In the liquid crystal display device of the present invention, the weight proportion of the conductive powder in the fluorescent powder mixture is 1%-5%.

In the liquid crystal display device of the present invention, the molar ratio of aluminum atom to zinc atom in the aluminum zinc oxide is 1:99-5:95; the molar ratio of gallium atom to zinc atom in the gallium zinc oxide is 1:99-5:95; and the molar ratio of indium atom to tin atom in the indium tin oxide is 1:99-5:95.

In the liquid crystal display device of the present invention, the fluorescent powder is $Y_2SiO_4$:Ce, $CaGaO_3$:Tm, $BaMgAl_{10}O_{17}$:Eu, $ZnGa_2O_4$:Mn, $Y_2SiO_5$:Tb, $Zn_2SiO_4$:Mn, YAG:Ce or $Y_2O_3$:Eu.

In the liquid crystal display device of the present invention, the conductive powder is obtained by a sol-gel process.

Comparing to the traditional fluorescent powder and corresponding liquid crystal device, the fluorescent powder mixture, the manufacturing method for the same, and the corresponding liquid crystal display device of the present invention produce the fluorescent powder mixture by mixing the conductive powder with the fluorescent powder, so that the conductivity of the fluorescent powder is increased, the electron enrichment phenomenon on the surface of the fluorescent powder is further weakened, the illumination performance of the fluorescent powder is increased, and the technical problem of that the illumination performance of the fluorescent powder of traditional field emission light source being poor is solved.

The above contents will be better understood from the following description being considered in connection with the accompanied drawings and in which a preferred embodiment of the invention is illustrated by way of example.

BRIEF DESCRIPTION OF THE DRAWINGS

FIG. 1 is a flow chart according to a preferred embodiment of the manufacturing method for the fluorescent mixture of the present invention.

DETAILED DESCRIPTION OF THE PREFERRED EMBODIMENTS

The following description of each embodiment refers to the accompanying drawing, so as to illustrate specific embodiments of the present invention which may be implemented.

The present invention relates to a fluorescent powder mixture used in the field emission light source, wherein the fluorescent powder mixture comprises a conductive powder and a fluorescent powder, and the conductive powder may be aluminum zinc oxide, gallium zinc oxide or indium tin oxide. Here, the conductive powder may also be the mixture of aluminum zinc oxide and gallium zinc oxide, the mixture of gallium zinc oxide and indium tin oxide, the mixture of indium tin oxide and aluminum zinc oxide, or the mixture of all three of aluminum zinc oxide, gallium zinc oxide, and indium tin oxide. The weight proportion of the conductive powder in the fluorescent powder mixture is 1%-5%. If the proportion of the conductive powder is too small, the electron enrichment phenomenon on the surface of the fluorescent powder may not be efficiently eliminated; and if the proportion of the conductive powder is too large, the illumination performance of the fluorescent powder will be affected.

When the conductive powder is aluminum zinc oxide, the molar ratio of aluminum atom to zinc atom therein is 1:99 to 5:95; when the conductive powder is gallium zinc oxide, the molar ratio of gallium atom to zinc atom therein is 1:99 to 5:95; when the conductive powder is indium tin oxide, the molar ratio of indium atom to tin atom therein is 1:99 to 5:95. The fluorescent powder can be $Y_2SiO_4$:Ce, $CaGaO_3$:Tm, $BaMgAl_{10}O_{17}$:Eu, $ZnGa_2O_4$:Mn, $Y_2SiO_5$:Tb, $Zn_2SiO_4$:Mn, YAG:Ce or $Y_2O_3$:Eu. Both the conductive powder and the fluorescent powder may be obtained by a sol-gel process.

Please refer to FIG. 1. FIG. 1 is a flow chart according to a preferred embodiment of the manufacturing method for the fluorescent powder mixture of the present invention. The manufacturing process for the fluorescent powder mixture of the present invention will be explained in detail by FIG. 1. The manufacturing method includes Step 101-Step 105:

At Step 101, placing a raw material of a conductive powder in a container by using a solvent;

At Step 102, after adding a stabilizer in the container, stirring for 4-6 hours under heating in 50-70° C. water bath, so as to obtain a precursor solution of the conductive powder;

At Step 103, seasoning the precursor solution of the conductive powder under a temperature of 50-70° C. for 56-90 hours, so as to obtain a xerogel of the conductive powder;

At Step 104, heating the xerogel of the conductive powder under a temperature of 600-900° C. for 1-5 hours, so as to obtain the conductive powder; and At Step 105, providing a fluorescent powder, and mixing the conductive powder with the fluorescent powder, so as to obtain the fluorescent powder mixture.

The raw material of the conductive powder may be a mixture of aluminum salt and zinc salt, a mixture of gallium salt and zinc salt or a mixture of tin salt and indium salt.

The following description taking the conductive powder being aluminum salt and zinc salt as an example, wherein the specific Step 101 is: weighing a mixture of aluminum salt (such as aluminum chloride or aluminum nitrate, etc) and zinc salt (such as zinc chloride or zinc nitrate, etc), wherein the molar ratio of the aluminum atom to the zinc atom is 1:99-5:95, and then using solution of ethylene glycol monomethyl ether or ethanol solution to dissolve the above-mentioned mixture of aluminum salt and zinc salt in a container.

The specific Step 102 is: adding monoethanolamine, diethanolamine or triethanolamine into the container in which the mixture of aluminum salt and zinc salt is dissolved, and stiffing for 4-6 hours under heating in 50-70° C. water bath, so that a clear precursor solution of the conductive powder is obtained.

The specific Step 103 is: seasoning the precursor solution of the conductive powder obtained from the former step under a temperature of 50-70° C. in a drying oven, so as to obtain a xerogel of the conductive powder.

The specific Step 104 is: heating the xerogel of the conductive powder obtained from the former step in a muffle furnace for 1-5 hours, wherein the temperature of the thermal processing is 600-900° C., so as to obtain the conductive powder. The conductive powder is aluminum zinc oxide.

The specific Step 105 is: providing a fluorescent powder, and mixing the above-mentioned aluminum zinc oxide and the fluorescent powder by 1:99-5:95 by weight, so as to obtain the final fluorescent powder mixture. The fluorescent powder may be a powder of $Y_2SiO_4$:Ce, $CaGaO_3$:Tm, $BaMgAl_{10}O_{17}$:Eu, $ZnGa_2O_4$:Mn, $Y_2SiO_5$:Tb, $Zn_2SiO_4$:Mn, YAG:Ce or $Y_2O_3$:Eu. The raw material of the conductive powder of the present invention may also be a mixture of gallium salt and zinc salt or a mixture of tin salt and indium salt, and therefore the obtained conductive powder may be gallium zinc oxide or indium tin oxide.

The present invention further relates to a liquid crystal display device, which includes a display panel and a backlight module, the backlight module is used for providing a light to the display panel. The backlight module uses a field emission light source as a backlight source, which makes the light extraction of the backlight module more uniform, and makes the manufacturing cost lower. The field emission light source includes an anode which comprises the above-mentioned fluorescent powder mixture disposed on its surface, a cathode for emitting electron beams, and a separating frame for separating the anode from the cathode. When manufacturing the field emission light source, the above-mentioned fluorescent powder mixture may be printed onto a white glass by a silk-screen to obtain the anode, and carbon nanotubes/ZnO nanowires may be printed on the white glass to obtain the cathode, and then the separating frame (such as low melting point glass powder) may be disposed between the anode and the cathode. At this time, packaging the field emission light source under a temperature of 300-600° C. to form an enclosed space. The anode is used as an upper plate of the enclosed space, while the cathode is used as a lower plate of the enclosed space, wherein the separating frame is melt on the two glass layers of the anode and the cathode, so as to ensure that there is a certain gap between the anode and the cathode. Vacuuming the enclosed space through a reserved opening and then sealing the reserved opening. Finally, the field emission light source of the present invention is obtained.

When using the field emission light source of the present invention, the conductivity of the fluorescent powder mixture disposed on the anode has improved, the electrons accumulated on the anode may be guided out timely. Therefore, the energy of the incident electron beam may not be lowered, and the illumination performance of the field emission light source is further enhanced. Besides, by adjusting the ratio of fluorescent powder of each color (such as red fluorescent powder, green fluorescent powder or blue fluorescent powder) in the fluorescent powder mixture, a frequency spectrum possessing different relative spectral power distribution is obtained. Being coordinated with a color filter of the liquid crystal display device, pictures with higher color saturation can be obtained.

The fluorescent powder mixture, the manufacturing method for the same and the corresponding liquid crystal display device of the present invention produce the fluorescent powder mixture by mixing a conductive powder with a fluorescent powder, so that the conductivity of the fluorescent powder is increased, the electron enrichment phenomenon on the surface of the fluorescent powder is further weakened, the illumination performance of the fluorescent powder and the field emission light source is increased, and the technical problem of that the illumination performance of the fluorescent powder of present field emission light source being poor is solved.

It should be understood, however, that even though numerous characteristics and advantages of the present invention have been set forth in the foregoing description, together with details of the structure and function of the invention, the disclosure is illustrative only, and changes may be made within the principles of the invention to the full extent indicated by the broad general meaning of the terms in which the appended claims are expressed.

What is claimed is:

1. A method for manufacturing fluorescent powder mixture, comprising steps of:
    placing a raw material of a conductive powder in a container by using a solvent;
    after adding a stabilizer in the container, stifling for 4-6 hours under heating in 50-70° C. water bath, so as to obtain a precursor solution of the conductive powder;
    seasoning the precursor solution of the conductive powder under a temperature of 50-70° C. for 56-90 hours, so as to obtain a xerogel of the conductive powder;
    heating the xerogel of the conductive powder under a temperature of 600-900° C. for 1-5 hours, so as to obtain the conductive powder; and
    providing a fluorescent powder, and mixing the conductive powder with the fluorescent powder, so as to obtain the fluorescent powder mixture,
    wherein the raw material of the conductive powder is a mixture of aluminum salt and zinc salt, a mixture of gallium salt and zinc salt or a mixture of tin salt and indium salt; and the conductive powder is aluminum zinc oxide, gallium zinc oxide or indium tin oxide.

2. The method for manufacturing fluorescent powder mixture of claim 1,
    wherein the weight proportion of the conductive powder in the fluorescent powder mixture is 1%-5%.

3. The method for manufacturing fluorescent powder mixture of claim 1, wherein the molar ratio of aluminum atom to zinc atom in the aluminum zinc oxide is 1:99-5:95; the molar ratio of gallium atom to zinc atom in the gallium zinc oxide is 1:99-5:95; or the molar ratio of indium atom to tin atom in the indium tin oxide is 1:99-5:95.

4. The method for manufacturing fluorescent powder mixture of claim 1, wherein the solvent is solution of ethylene glycol monomethyl ether or ethanol solution; and the stabilizer is monoethanolamine, diethanolamine or triethanolamine.

5. The method for manufacturing fluorescent powder mixture of claim 1, wherein the fluorescent powder is $Y_2SiO_4$:Ce, $CaGaO_3$:Tm, $BaMgAl_{10}O_{17}$:Eu, $ZnGa_2O_4$:Mn, $Y_2SiO_5$:Tb, $Zn_2SiO_4$:Mn, YAG:Ce or $Y_2O_3$:Eu.

6. The method for manufacturing fluorescent powder mixture of claim 1, wherein the conductive powder is obtained by a sol-gel process.

* * * * *